(12) United States Patent
Guerra et al.

(10) Patent No.: US 7,259,208 B2
(45) Date of Patent: Aug. 21, 2007

(54) REINFORCED POLYMER ELECTROLYTE MEMBRANE

(75) Inventors: Miguel A. Guerra, Woodbury, MN (US); Michael A. Yandrasits, Hastings, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 0 days.

(21) Appl. No.: 10/712,360

(22) Filed: Nov. 13, 2003

(65) Prior Publication Data

US 2005/0107532 A1    May 19, 2005

(51) Int. Cl.
*C08F 8/30*    (2006.01)

(52) U.S. Cl. ............... 525/178; 525/212; 525/231; 525/328.5; 525/540

(58) Field of Classification Search ............ 525/178, 525/212, 231, 328.5, 540
See application file for complete search history.

(56) References Cited

U.S. PATENT DOCUMENTS

| | | | |
|---|---|---|---|
| 3,282,875 A | 11/1966 | Connolly et al. | |
| 3,635,926 A | 1/1972 | Gresham et al. | |
| 3,784,399 A | 1/1974 | Grot | |
| 3,853,828 A | 12/1974 | Wall et al. | |
| 4,000,356 A | 12/1976 | Weisgerber et al. | |
| 4,073,752 A | 2/1978 | Ramp | |
| 4,169,023 A | 9/1979 | Sata et al. | |
| 4,214,060 A | 7/1980 | Apotheker et al. | |
| 4,218,542 A | 8/1980 | Ukihashi et al. | |
| 4,230,549 A | 10/1980 | D'Agostino et al. | |
| 4,242,498 A | 12/1980 | Rosser et al. | |
| 4,268,650 A | 5/1981 | Rose | |
| 4,281,092 A | 7/1981 | Breazeale | |
| 4,330,654 A | 5/1982 | Ezzell et al. | |
| 4,334,082 A | 6/1982 | Resnick | |
| 4,391,844 A | 7/1983 | Baczek et al. | |
| 4,414,159 A | 11/1983 | Resnick | |
| 4,440,917 A | 4/1984 | Resnick | |
| 4,454,247 A | 6/1984 | Resnick | |
| 4,470,889 A | 9/1984 | Ezzell et al. | |
| 4,508,603 A | 4/1985 | Ukihashi et al. | |
| 4,522,952 A | 6/1985 | Klein et al. | |
| 4,602,045 A | 7/1986 | Markus et al. | |
| 4,686,024 A | 8/1987 | Scherer, Jr. et al. | |

(Continued)

FOREIGN PATENT DOCUMENTS

DE    26 24 203    12/1976

(Continued)

OTHER PUBLICATIONS

U.S. Appl. No. 10/325,278, filed Dec. 19, 2002; Polymer Electrolyte Membrane.

(Continued)

*Primary Examiner*—Duc Truong
(74) *Attorney, Agent, or Firm*—Philip Y. Dahl

(57) ABSTRACT

A method is provided for making a reinforced polymer electrolyte membrane, such as may be used in electrolytic cells such as fuel cells, by mixing a sulfonate- or sulfonyl halide-functional polymer with a bisamidine compound and subsequently trimerizing the amidine groups of the bisamidine compound to form triazine linkages. The sulfonyl halide or sulfonate groups may then be converted to sulfonic acid groups, yielding a polymer electrolyte reinforced with a polytriazine.

19 Claims, 2 Drawing Sheets

U.S. PATENT DOCUMENTS

| | | |
|---|---|---|
| 4,734,474 A | 3/1988 | Hamada et al. |
| 4,743,419 A | 5/1988 | Bierschenk |
| 4,755,567 A | 7/1988 | Bierschenk et al. |
| 4,981,932 A | 1/1991 | Blaise et al. |
| 5,260,351 A | 11/1993 | Logothetis |
| 5,264,508 A | 11/1993 | Ishibe et al. |
| 5,330,626 A | 7/1994 | Banerjee |
| 5,466,930 A | 11/1995 | Schlenoff |
| 5,527,861 A | 6/1996 | Logothetis |
| 5,608,022 A | 3/1997 | Nakayama et al. |
| 5,693,748 A | 12/1997 | Ikeda et al. |
| 5,795,496 A | 8/1998 | Yen et al. |
| 5,798,417 A | 8/1998 | Howard, Jr. |
| 5,804,650 A | 9/1998 | Tsuda et al. |
| 5,852,148 A | 12/1998 | Behr et al. |
| 5,986,012 A | 11/1999 | Legare et al. |
| 6,011,074 A | 1/2000 | Sorenson et al. |
| 6,090,895 A | 7/2000 | Mao et al. |
| 6,224,994 B1 | 5/2001 | Asukabe et al. |
| 6,225,368 B1 | 5/2001 | D'Agostino et al. |
| 6,242,123 B1 | 6/2001 | Nezu et al. |
| 6,248,469 B1 | 6/2001 | Formato et al. |
| 6,254,978 B1 | 7/2001 | Bahar et al. |
| 6,255,370 B1 | 7/2001 | Vizcaino et al. |
| RE37,307 E | 8/2001 | Bahar et al. |
| 6,274,677 B1 | 8/2001 | Tatemoto |
| 6,277,512 B1 | 8/2001 | Hamrock et al. |
| 6,355,370 B2 | 3/2002 | Katoh et al. |
| RE37,656 E | 4/2002 | Bahar et al. |
| 6,365,769 B1 | 4/2002 | Behr et al. |
| 6,380,337 B2 | 4/2002 | Abe et al. |
| RE37,701 E | 5/2002 | Bahar et al. |
| 6,387,964 B1 | 5/2002 | D'Agostino et al. |
| 6,423,784 B1 | 7/2002 | Hamrock et al. |
| 6,426,397 B1 | 7/2002 | Armand et al. |
| 6,462,228 B1 | 10/2002 | Dams |
| 6,498,216 B1 | 12/2002 | Cheng |
| 6,503,378 B1 | 1/2003 | Fisher |
| 6,552,135 B2 | 4/2003 | Schnurnberger et al. |
| 6,624,328 B1 | 9/2003 | Guerra |
| 6,649,703 B2 | 11/2003 | Michot et al. |
| 6,667,377 B2 | 12/2003 | Feiring et al. |
| 6,670,424 B1 | 12/2003 | Michot et al. |
| 6,872,781 B2 | 3/2005 | Hedhli et al. |
| 2002/0014405 A1 | 2/2002 | Arcella et al. |
| 2002/0040106 A1 | 4/2002 | Wlassics et al. |
| 2003/0032739 A1 | 2/2003 | Kerres et al. |
| 2003/0092940 A1 | 5/2003 | Hamrock |
| 2003/0181572 A1 | 9/2003 | Tan et al. |
| 2003/0181615 A1 | 9/2003 | Ameduri et al. |
| 2003/0208014 A1 | 11/2003 | Kerres et al. |
| 2004/0241518 A1 | 12/2004 | Yang |
| 2005/0098442 A1 | 5/2005 | Thaier et al. |
| 2005/0107488 A1 | 5/2005 | Yandrasits et al. |
| 2005/0107489 A1 | 5/2005 | Yandrasits et al. |
| 2005/0107490 A1 | 5/2005 | Yandrasits et al. |
| 2005/0113628 A1 | 5/2005 | Jing et al. |
| 2005/0131096 A1 | 6/2005 | Jing et al. |
| 2005/0131097 A1 | 6/2005 | Jing et al. |
| 2005/0137351 A1 | 6/2005 | Guerra |

FOREIGN PATENT DOCUMENTS

| | | |
|---|---|---|
| DE | 26 38 791 | 3/1977 |
| DE | 100 21 104 A1 | 11/2001 |
| EP | 0 048 964 A2 | 4/1982 |
| EP | 0 407 937 | 1/1991 |
| EP | 0 422 231 B1 | 12/1995 |
| EP | 1 085 038 A1 | 3/2001 |
| EP | 1 091 435 A1 | 4/2001 |
| EP | 1 179 548 A1 | 2/2002 |
| EP | 1 238 999 A1 | 9/2002 |
| EP | 1 359 142 A1 | 11/2003 |
| FR | 2 387 260 | 11/1978 |
| GB | 1184321 | 3/1970 |
| JP | 53-29291 | 3/1978 |
| JP | 53-97988 | 8/1978 |
| JP | 53-134088 | 11/1978 |
| JP | 54-52690 | 4/1979 |
| JP | 56-72002 | 6/1981 |
| JP | SHO 60-250009 | 12/1985 |
| JP | SHO 62-288617 | 12/1987 |
| JP | 64-3140 | 1/1989 |
| JP | 5-314960 | 11/1993 |
| JP | 8-239494 | 9/1996 |
| JP | 2000-119420 | 4/2000 |
| JP | 2000-268834 | 9/2000 |
| JP | 2001-29800 | 2/2001 |
| JP | 2001-176524 | 6/2001 |
| JP | 2001-354641 | 12/2001 |
| JP | 2002-003466 | 1/2002 |
| JP | 2002-313364 | 10/2002 |
| WO | WO94/03503 | 2/1994 |
| WO | WO97/17381 | 5/1997 |
| WO | WO99/38897 | 8/1999 |
| WO | WO 00/52060 | 9/2000 |
| WO | WO 01/27167 A1 | 4/2001 |
| WO | WO 01/87992 A2 | 11/2001 |
| WO | WO 01/96268 A2 | 12/2001 |
| WO | WO 02/50142 A1 | 6/2002 |
| WO | WO 02/062749 A1 | 8/2002 |
| WO | WO 02/087001 A2 | 10/2002 |
| WO | WO 02/103834 A1 | 12/2002 |
| WO | WO 03/004463 A1 | 1/2003 |
| WO | WO 03/022892 A2 | 3/2003 |

OTHER PUBLICATIONS

Kirk-Othmer, *Encyclopedia of Chemical Technology*, 3d ed., vol. 10, (1980), pp. 840-851.

Gab-Jin Hwang et al.; "Preparation Of Cation Exchange Membrane As A Separator For The All-Vanadium Redox Flow Battery", Journal of Membrane Science, Elsevier Scientific Publ. Company, Amsterdam, NL, vol. 120, No. 1, Oct. 30, 1996, pp. 55-67.

REINFORCED POLYMER ELECTROLYTE MEMBRANE

FIELD OF THE INVENTION

This invention relates to a method of making a reinforced polymer electrolyte membrane, such as may be used in electrolytic cells such as fuel cells, by mixing a sulfonate- or sulfonyl halide-functional polymer with a bisamidine compound and subsequently trimerizing the amidine groups of the bisamidine compound to form triazine linkages. The sulfonyl halide or sulfonate groups may then be converted to sulfonic acid groups, yielding a polymer electrolyte reinforced with a polytriazine.

BACKGROUND OF THE INVENTION

International Patent Application Publication No. WO 02/50142 A1 purportedly discloses fluorosulfonated nitrile crosslinkable elastomers based on vinylidene fluoride with low Tg.

U.S. Pat. No. 5,260,351 purportedly discloses perfluoroelastomers cured by radiation in the absence of curing agents. The reference purportedly relates to curing of fully fluorinated polymers, such as those prepared from tetrafluoroethylene, a perfluoralkyl perfluorovinyl ether, and cure site or crosslinking units providing at least one of nitrile, perfluorophenyl, bromine or iodine in the resulting terpolymer.

U.S. Pat. No. 5,527,861 purportedly discloses nitrile containing perfluoroelastomers cured by a combination of a peroxide, a coagent, and a catalyst which causes crosslinks to form using the nitrile groups.

U.S. Pat. Nos. 4,334,082, 4,414,159, 4,440,917, and 4,454,247 purportedly disclose an ion exchange membrane for use in a chlor-alkali electrolysis cell formed from a copolymer of a vinyl ether monomer of the formula:

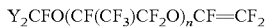

where Y is selected from the group consisting of $CF_2CN$, $CF_2CO_2R$, $CF_2CO_2H$, $CF_2CO_2M$, $CF_2CONH_2$ and $CF_2CONR$; a perfluorinated comonomer selected from tetrafluoroethylene, hexafluoropropylene, and perfluoroalkylvinyl ether; and

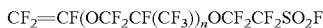

where n is 1 or 2. (U.S. Pat. No. 4,454,247 at claim 1). These references purportedly disclose a method of curing fluoroelastomers by trimerization of nitriles to form triazine rings. (U.S. Pat. No. 4,454,247 at col. 10, lns. 60-68).

U.S. Pat. No. 4,242,498 purportedly discloses crosslinked elastomeric polytriazines.

U.S. Pat. No. 5,693,748 purportedly discloses a high molecular weight polyimidoylamidine and a high molecular weight polytriazine derived therefrom.

U.S. Pat. No. 6,277,512 discloses a polymer electrolyte membrane comprising an intimate mixture of an ionomeric polymer and a structural film-forming polymer. Optionally, one or both are crosslinked.

SUMMARY OF THE INVENTION

Briefly, the present invention provides a method of making a polymer electrolyte membrane comprising the steps of: a) providing a mixture of a polymer comprising a fluorinated backbone and first pendant groups which comprise groups selected from sulfonyl halide and sulfonate groups, and a bisamidine compound; b) forming the mixture into a membrane; and c) reacting the amidine groups to form triazine groups. The method may comprise an additional step of d) converting the groups selected from sulfonyl halide and sulfonate groups to sulfonic acid groups. The bisamidine compounds are typically compounds according to the formula:

where $R^{11}$ is a divalent, branched or unbranched, partially or fully fluorinated, alkyl or ether group comprising 1-15 carbon atoms and 0-4 oxygen atoms. The first pendant groups are typically according to the formula: $-R^1-SO_2X$, where X is a halogen or $-O^-A^+$, where $A^+$ is any suitable organic or inorganic cation but most typically an ammonium cation, and where $R^1$ is a branched or unbranched perfluoroalkyl or perfluoroether group comprising 1-15 carbon atoms and 0-4 oxygen atoms, most typically $-O-CF_2-CF_2-CF_2-CF_2-SO_2X$ or $-O-CF_2-CF(CF_3)-O-CF_2-SO_2X$. Step b) may comprise imbibing the mixture into a porous supporting matrix, which is typically a porous polytetrafluoroethylene web.

In another aspect, the present invention provides polymer electrolyte membranes made according to any of the methods of the present invention.

In another aspect, the present invention provides polymer electrolyte membranes comprising an intimate mixture of: a) a first polymer comprising a fluorinated backbone and first pendant groups which comprise sulfonic acid groups; and b) a second polymer which is a fluorinated polytriazine. The first pendant groups are typically according to the formula: $-R^1-SO_3H$, where $R^1$ is a branched or unbranched perfluoroalkyl or perfluoroether group comprising 1-15 carbon atoms and 0-4 oxygen atoms, more typically $-O-CF_2-CF_2-CF_2-CF_2-SO_3H$ or $-O-CF_2-CF(CF_3)-O-CF_2CF_2-SO_3H$. The second polymer typically comprises trivalent groups according to the formula:

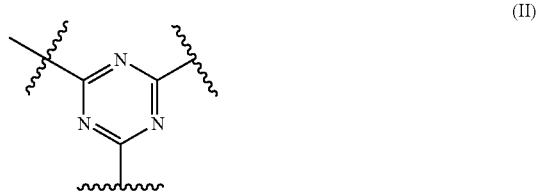

which are linked by divalent groups $-R^{11}-$, where $R^{11}$ is a branched or unbranched, partially or fully fluorinated, alkyl or ether group comprising 1-15 carbon atoms and 0-4 oxygen atoms. $R^{11}$ is more typically a perfluorinated alkyl group comprising 2-8 carbon atoms and most typically $-C_4F_8-$. The intimate mixture may be embedded in a porous supporting matrix, such as a porous polytetrafluoroethylene web.

In this application:

"equivalent weight" (EW) of a polymer means the weight of polymer which will neutralize one equivalent of base;

"hydration product" (HP) of a polymer means the number of equivalents (moles) of water absorbed by a membrane per equivalent of sulfonic acid groups present in the membrane multiplied by the equivalent weight of the polymer; and "highly fluorinated" means containing fluorine in an amount of 40 wt % or more, typically 50 wt % or more and more typically 60 wt % or more.

DETAILED DESCRIPTION

Figure 1:
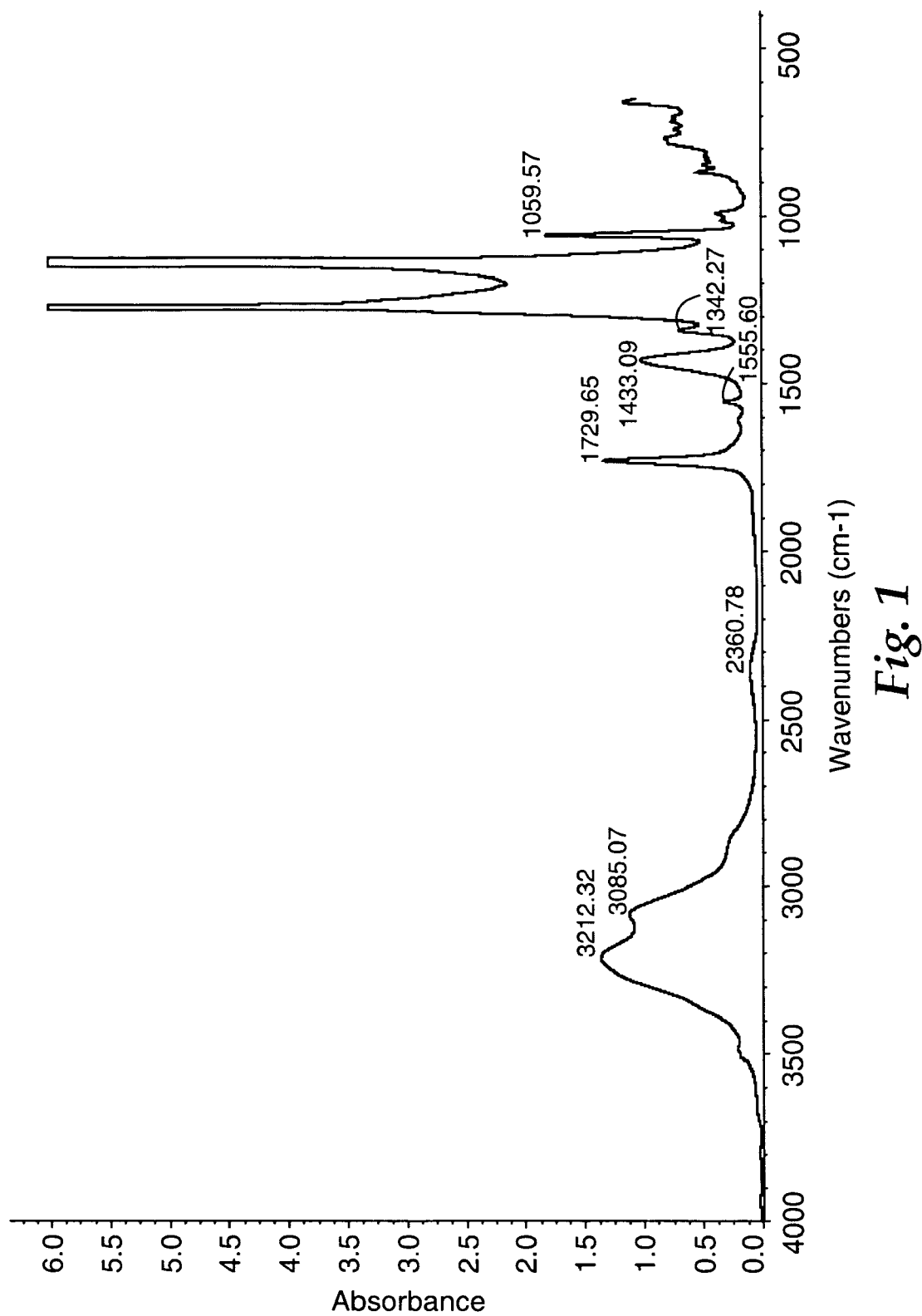
FIG. 1 is an IR spectrograph of a sample of a polymer electrolyte membrane according to the present invention.

The present invention provides a polymer electrolyte membrane. The membrane is made by first mixing a polymer comprising a fluorinated backbone and first pendant groups which include a group according to the formula —$SO_2X$, where X is a halogen or —$O^-A^+$, where $A^+$ is any suitable organic or inorganic cation, with a bisamidine compound, and second, trimerizing the amidine groups to form linkages comprising triazine groups, i.e., trivalent groups according to the formula:

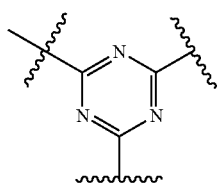

(II)

Such reinforced polymer electrolyte membranes (PEM's) may be used in electrolytic cells such as fuel cells.

PEM's manufactured from the crosslinked polymer according to the present invention may be used in the fabrication of membrane electrode assemblies (MEA's) for use in fuel cells. An MEA is the central element of a proton exchange membrane fuel cell, such as a hydrogen fuel cell. Fuel cells are electrochemical cells which produce usable electricity by the catalyzed combination of a fuel such as hydrogen and an oxidant such as oxygen. Typical MEA's comprise a polymer electrolyte membrane (PEM) (also known as an ion conductive membrane (ICM)), which functions as a solid electrolyte. One face of the PEM is in contact with an anode electrode layer and the opposite face is in contact with a cathode electrode layer. Each electrode layer includes electrochemical catalysts, typically including platinum metal. Gas diffusion layers (GDL's) facilitate gas transport to and from the anode and cathode electrode materials and conduct electrical current. The GDL may also be called a fluid transport layer (FTL) or a diffuser/current collector (DCC). The anode and cathode electrode layers may be applied to GDL's in the form of a catalyst ink, and the resulting coated GDL's sandwiched with a PEM to form a five-layer MEA. Alternately, the anode and cathode electrode layers may be applied to opposite sides of the PEM in the form of a catalyst ink, and the resulting catalyst-coated membrane (CCM) sandwiched with two GDL's to form a five-layer MEA. The five layers of a five-layer MEA are, in order: anode GDL, anode electrode layer, PEM, cathode electrode layer, and cathode GDL. In a typical PEM fuel cell, protons are formed at the anode via hydrogen oxidation and transported across the PEM to the cathode to react with oxygen, causing electrical current to flow in an external circuit connecting the electrodes. The PEM forms a durable, non-porous, electrically non-conductive mechanical barrier between the reactant gases, yet it also passes $H^+$ ions readily.

The sulfonate- or sulfonyl halide-functional polymer comprises a backbone, which may be branched or unbranched but is typically unbranched. The backbone is fluorinated, typically highly fluorinated, and more typically perfluorinated. The backbone may comprise units derived from tetrafluoroethylene (TFE), i.e., typically —$CF_2$—$CF_2$— units, and units derived from co-monomers, typically including at least one according to the formula $CF_2$=CY—R where Y is typically F but may also be $CF_3$, and where R is a first pendant group which includes a group according to the formula —$SO_2X$ which is a sulfonyl halide (X is a halogen) or a sulfonate (X is —$O^-A^+$). Where —$SO_2X$ is a sulfonyl halide, X is most typically F. Where —$SO_2X$ is a sulfonate, any suitable counterion $A^+$ may be present, including organic or inorganic counterions, including metal ions such as Li, Na, K, and the like, ammonium ions, quaternary ammonium ions, including cyclic compounds, and the like. In an alternative embodiment, first pendant groups R may be added to the backbone by grafting. Typically, first pendant groups R are highly fluorinated and more typically perfluorinated. R may be aromatic or non-aromatic. Typically, R is —$R^1$—$SO_2X$, where $R^1$ is a branched or unbranched perfluoroalkyl or perfluoroether group comprising 1-15 carbon atoms and 0-4 oxygen atoms. $R^1$ is typically —O—$R^2$— wherein $R^2$ is a branched or unbranched perfluoroalkyl or perfluoroether group comprising 1-15 carbon atoms and 0-4 oxygen atoms. $R^1$ is more typically —O—$R^3$— wherein $R^3$ is a perfluoroalkyl group comprising 1-15 carbon atoms. Examples of $R^1$ include:

—$(CF_2)_n$— where n is 1, 2, 3, 4, 5, 6, 7, 8, 9, 10, 11, 12, 13, 14 or 15

(—$CF_2CF(CF_3)$—)$_n$ where n is 1, 2, 3, 4, or 5

(—$CF(CF_3)CF_2$—)$_n$ where n is 1, 2, 3, 4, or 5(—$CF_2CF(CF_3)$—)$_n$—$CF_2$— where n is 1, 2, 3 or 4

(—O—$CF_2CF_2$—)$_n$ where n is 1, 2, 3, 4, 5, 6 or 7

(—O—$CF_2CF_2CF_2$—)$_n$ where n is 1, 2, 3, 4, or 5

(—O—$CF_2CF_2CF_2CF_2$—)$_n$ where n is 1, 2 or 3

(—O—$CF_2CF(CF_3)$—)$_n$ where n is 1, 2, 3, 4, or 5

(—O—$CF_2CF(CF_2CF_3)$—)$_n$ where n is 1, 2 or 3

(—O—$CF(CF_3)CF_2$—)$_n$ where n is 1, 2, 3, 4 or 5

(—O—$CF(CF_2CF_3)CF_2$—)$_n$ where n is 1, 2 or 3

(—O—$CF_2CF(CF_3)$—)$_n$—O—$CF_2CF_2$— where n is 1, 2, 3 or 4

(—O—$CF_2CF(CF_2CF_3)$—)$_n$—O—$CF_2CF_2$— where n is 1, 2 or 3

(—O—$CF(CF_3)CF_2$—)$_n$—O—$CF_2CF_2$— where n is 1, 2, 3 or 4

(—O—$CF(CF_2CF_3)CF_2$—)$_n$—O—$CF_2CF_2$— where n is 1, 2 or 3

—O—$(CF_2)_n$— where n is 1, 2, 3, 4, 5, 6, 7, 8, 9, 10, 11, 12, 13 or 14

R is typically —O—$CF_2CF_2CF_2CF_2$—$SO_2X$ or —O—$CF_2$—$CF(CF_3)$—O—$CF_2$—$CF_2$—$SO_2X$ and most typically —O—$CF_2CF_2CF_2CF_2$—$SO_2X$. The —$SO_2X$ group is most typically —$SO_2F$ during polymerization, i.e., X is F. The —$SO_2X$ group is typically —$SO_2F$ or —$SO_2$—$O^-A^+$ during membrane formation. The —$SO_2X$ group is typically converted to —$SO_3H$ at some point prior to use of the fluoropolymer as an polymer electrolyte.

The fluoromonomer providing first side group R may be synthesized by any suitable means, including methods disclosed in U.S. Pat. No. 6,624,328.

The bisamidine compound is typically a compound according to the formula:

(I)

where $R^{11}$ is a divalent, branched or unbranched, partially or fully fluorinated, alkyl or ether group comprising 1-15 carbon atoms and 0-4 oxygen atoms. $R^{11}$ is typically highly fluorinated and more typically perfluorinated. $R^{11}$ is typically unbranched. $R^{11}$ typically comprises 2-10 carbon atoms and 0 oxygen atoms. $R^{11}$ more typically comprises 2-6 carbon atoms and 0 oxygen atoms.

The bisamidine compounds may be commercially available or may be synthesized by any suitable method. Bisamidine compounds may be derived from nitrile compounds according to the formula:

$$N\equiv C-R^{11}-C\equiv N \quad (III)$$

where $R^{11}$ is as above, e.g., by addition of ammonia.

The polymer may be made by any suitable method, including emulsion polymerization, extrusion polymerization, polymerization in supercritical carbon dioxide, solution or suspension polymerization, and the like. In one typical polymerization, $CF_2=CF-O-CF_2CF_2CF_2CF_2-SO_2F$ (MV4S) is preemulsified in water with an emulsifier (ammonium perfluorooctanoate, $C_7F_{15}COONH_4$) under high shear (24,000 rpm). An oxygen-free polymerization kettle equipped with an impeller agitator system is charged with deionized water and heated to 50° C. and then the preemulsion is charged into the polymerization kettle. The kettle is further charged with gaseous tetrafluoroethylene (TFE) to 6-8 bar absolute reaction pressure. At 50° C. and 240 rpm agitator speed polymerization is initiated by addition of sodium disulfite and ammonium peroxodisulfate. During the course of the reaction, the reaction temperature is maintained at 50° C. Reaction pressure is maintained at 6-8 bar absolute by feeding additional TFE into the gas phase. A second portion of MV4S preemulsion may be continuously fed into the liquid phase during the course of the reaction. After feeding sufficient TFE, the monomer feed may be interrupted and the continuing polymerization allowed to reduce the pressure of the monomer gas phase. The reactor may then be vented and flushed with nitrogen gas.

In one embodiment of the present invention the polymer is processed in sulfonyl halide form. In an alternate embodiment, the polymer is processed in sulfonate form.

Sulfonyl halide groups of the polymer may be converted to sulfonate form by hydrolysis in a base. In one typical process, the polymer is contacted with an aqueous solution of a base AOH that will provides a suitable counterion $A^+$, as described above. Most typically, AOH is $NH_4OH$. In one embodiment, the immersed membrane is titrated to neutrality. In another embodiment, a small excess of base is added, e.g., 1-50% more than the number of sulfonyl halide functions present.

The polymer may be blended with the bisamidine by any suitable method, including mixing in solution or suspension, kneading, milling, or the like.

Typically, the blend is formed into a membrane prior to crosslinking. Any suitable method of forming the membrane may be used. The blend is typically cast from a suspension. Any suitable casting method may be used, including bar coating, spray coating, slit coating, brush coating, and the like. Alternately, the membrane may be formed from neat polymer in a melt process such as extrusion. After forming, the membrane may be annealed. Typically the membrane has a thickness of 90 microns or less, more typically 60 microns or less, and most typically 30 microns or less. A thinner membrane may provide less resistance to the passage of ions. In fuel cell use, this results in cooler operation and greater output of usable energy. Thinner membranes must be made of materials that maintain their structural integrity in use. In one typical process, membranes are cast by knife coating out of a water suspension containing 20% solids onto a glass plate and dried at 80° C. for 10 minutes to form films having a thickness of approximately 30 microns.

The step of amidine trimerization may be accomplished by any suitable method. Typically, trimerization is accomplished by application of heat, typically to a temperature of 160° C. or more. In addition, suitable initiators or catalysts may optionally be used, which may allow for trimerization at lower temperatures. Suitable initiators or catalysts may include ammonia, ammonium compounds, including salts of ammonium and salts of quaternary ammonium compounds, including cyclic compounds such as salts of 1,8-diazabicyclo[5.4.0]undec-7-ene (DBU), including salts of fluorinated carboxylates, Lewis acids, and the like. The step of crosslinking the polymer may occur in whole or part during annealing of the membrane or may be carried out separate from any annealing step. During the trimerization step, amidine groups trimerize to form linkages comprising triazine groups, i.e., trivalent groups according to the formula:

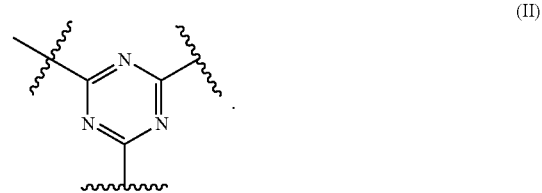

(II)

After trimerization, the sulfur-containing functions of the first pendant groups may be converted to sulfonic acid form by any suitable process. Sulfonyl halide groups may be converted by hydrolysis. In one typical process, the polymer is immersed in an aqueous solution of a strong base and subsequently acidified. In one typical embodiment, a polymer membrane is immersed in 15% KOH in water at 80° C. for 1 hour, then washed twice in 20% nitric acid at 80° C., then boiled in deionized water twice. Sulfonate groups may be converted by acidification with any suitable acid. In one typical embodiment, the membrane is washed twice in 20% nitric acid at 80° C., then boiled in deionized water twice.

The acid-functional pendant groups typically are present in an amount sufficient to result in an hydration product (HP) of greater than 15,000, more typically greater than 18,000, more typically greater than 22,000, and most typically greater than 25,000. In general, higher HP correlates with higher ionic conductance.

The acid-functional pendant groups typically are present in an amount sufficient to result in an equivalent weight (EW) of less than 1200, more typically less than 1100, and more typically less than 1000, and more typically less than 900.

In a further embodiment, the blend of fluoropolymer and bisamidine may be imbibed into a porous supporting matrix prior to reaction of the amidine groups, typically in the form of a thin membrane having a thickness of 90 microns or less, more typically 60 microns or less, and most typically 30 microns or less. Any suitable method of imbibing the blend of fluoropolymer and bisamidine into the pores of the supporting matrix may be used, including overpressure, vacuum, wicking, immersion, and the like. The blend becomes embedded in the matrix upon reaction of the amidine groups. Any suitable supporting matrix may be used. Typically the supporting matrix is electrically non-conductive. Typically, the supporting matrix is composed of a fluoropolymer, which is more typically perfluorinated.

Typical matrices include porous polytetrafluoroethylene (PTFE), such as biaxially stretched PTFE webs.

It will be understood that membranes made according to the method of the present invention may differ in chemical structure from those made by other methods, in the structure of crosslinks, the placement of crosslinks, the placement of acid-functional groups, and the like.

This invention is useful in the manufacture of strengthened polymer electrolyte membranes for use in electrolytic cells such as fuel cells.

Objects and advantages of this invention are further illustrated by the following examples, but the particular materials and amounts thereof recited in these examples, as well as other conditions and details, should not be construed to unduly limit this invention.

EXAMPLES

Unless otherwise noted, all reagents were obtained or are available from Aldrich Chemical Co., Milwaukee, Wis., or may be synthesized by known methods.

Bisamidine

Perfluoroadiponitrile bisamidine, $H_2N(HN=)C—C_4F_8—C(=NH)NH_2$, was prepared as follows.

A four-liter (L) plastic flask equipped with magnetic stirring was charged with methanol (188 g, 5.9 mol) and perfluoroadipoyl fluoride (454 g, 1.5 mol) (available from 3M Company, St. Paul, Minn.) was added, over one hour. A caustic scrubber was used to treat the hydrofluoric acid byproduct. Perfluoroadipate (446 g, 1.4 mol) was isolated by addition of water followed by distillation of the lower fluorochemical product phase. The perfluoroadipate (446 g, 1.4 mol) was charged into a two-liter (L) flask equipped with a mechanical stirrer in methanol and was reacted with an excess of ammonia (54 g, 3.2 mol) to give perfluoroadipoyl amide (385 g, 1.3 mol) after vacuum drying. A solution of perfluoroadipoyl amide (385 g, 1.3 mol) in dimethylformamide was charged into a three-liter (L) flask with a mechanical stirrer and reacted at –10° C. first with pyridine (508 g, 6.4 mol) followed by trifluoroacetic anhydride (674 g, 3.2 mol)(available from Aldrich Chemical Co., Milwaukee, Wis.). Perfluoroadiponitrile (235 g, 0.9 mol) with a 64° C. boiling point was isolated by addition of water followed by distillation of the lower fluorochemical product phase. The perfluoroadiponitrile (108 g, 0.4 mol) was charged into a one-liter (L) flask equipped with a mechanical stirrer in diethyl ether and was reacted at –10° C. with ammonia (17 g, 1.0 mol) to give perfluoroadiponitrile bisamidine (112 g, 0.9 mol) after vacuum drying, having a melting point of 132° C. The structure was confirmed by fluorine and proton NMR.

Polymer

The polymer electrolyte used in the present examples was made by emulsion co-polymerization of tetrafluoroethylene (TFE) with $CF_2=CF—O—(CF_2)_4—SO_2F$ (MV4S), which was synthesized by the method disclosed in U.S. Pat. No. 6,624,328, the disclosure of which is incorporated herein by reference.

MV4S was preemulsified in water with APFO emulsifier (ammonium perfluorooctanoate, $C_7F_{15}COONH_4$) under high shear (24,000 rpm), using an ULTRA-TURRAX® Model T 25 disperser S25KV-25F (IKA-Werke GmbH & Co. KG, Staufen, Germany) for 2 min. A polymerization kettle equipped with an impeller agitator system was charged with deionized water. The kettle was heated up to 50° C. and then the preemulsion was charged into the oxygen-free polymerization kettle. At 50° C. the kettle was further charged with gaseous tetrafluoroethylene (TFE) to 6 bar absolute reaction pressure. At 50° C. and 240 rpm agitator speed the polymerization was initiated by addition of sodium disulfite and ammonium peroxodisulfate. During the course of the reaction, the reaction temperature was maintained at 50° C. Reaction pressure was maintained at 6 bar absolute by feeding additional TFE into the gas phase. A second portion of MV4S-preemulsion was prepared, as described above. The second preemulsion portion was fed continuously into the liquid phase during the course of the reaction.

After feeding additional TFE, the monomer valve was closed and the monomer feed interrupted. The continuing polymerization reduced the pressure of the monomer gas phase to about 2 bar. At that time, the reactor was vented and flushed with nitrogen gas.

The polymer dispersion thus obtained was mixed with 5 equivalents of LiOH (based on sulfonyl fluoride concentration) and enough water to make a 20% polymer solids mixture. This mixture was heated to 250° C. for four hours. Most (>95%) of the polymer became dispersed under these conditions. The dispersions were filtered to remove LiF and undispersed polymer, and then ion exchanged on Mitsubishi Diaion SKT10L ion exchange resin to give the acid form of the ionomer. The resulting polymer electrolyte is a perfluorinated polymer with acidic side chains according to the formula: $—O—(CF_2)_4—SO_3H$. The resulting mixture was an acid dispersion at 18 to 19% polymer solids. This dispersion was concentrated in vacu to about 38% solids and then mixed with n-propanol to give the desired 20% solids dispersion in a water/n-propanol solvent mixture of about 40% water/60% n-propanol.

Casting Dispersion and Membranes $NH_4OH$ was added to the polymer dispersion obtained above in the amount of 1.1 equivalents relative to the sulfonic acid groups in the polymer to convert the sulfonic acid groups to ammonium sulfonate groups. Perfluoroadiponitrile bisamidine, $H_2N(HN=)C—C_4F_8—C(=NH)NH_2$, was added to achieve a 80/20 weight ratio of neutralized polymer to bisamidine.

Polymer membranes were cast and crosslinked by knife coating this suspension onto a glass plate, drying at 80° C. for 10 minutes, and annealing at 200° C. for 30 minutes. The thickness of the resulting films was approximately 30 microns.

Analysis

Figure 2:
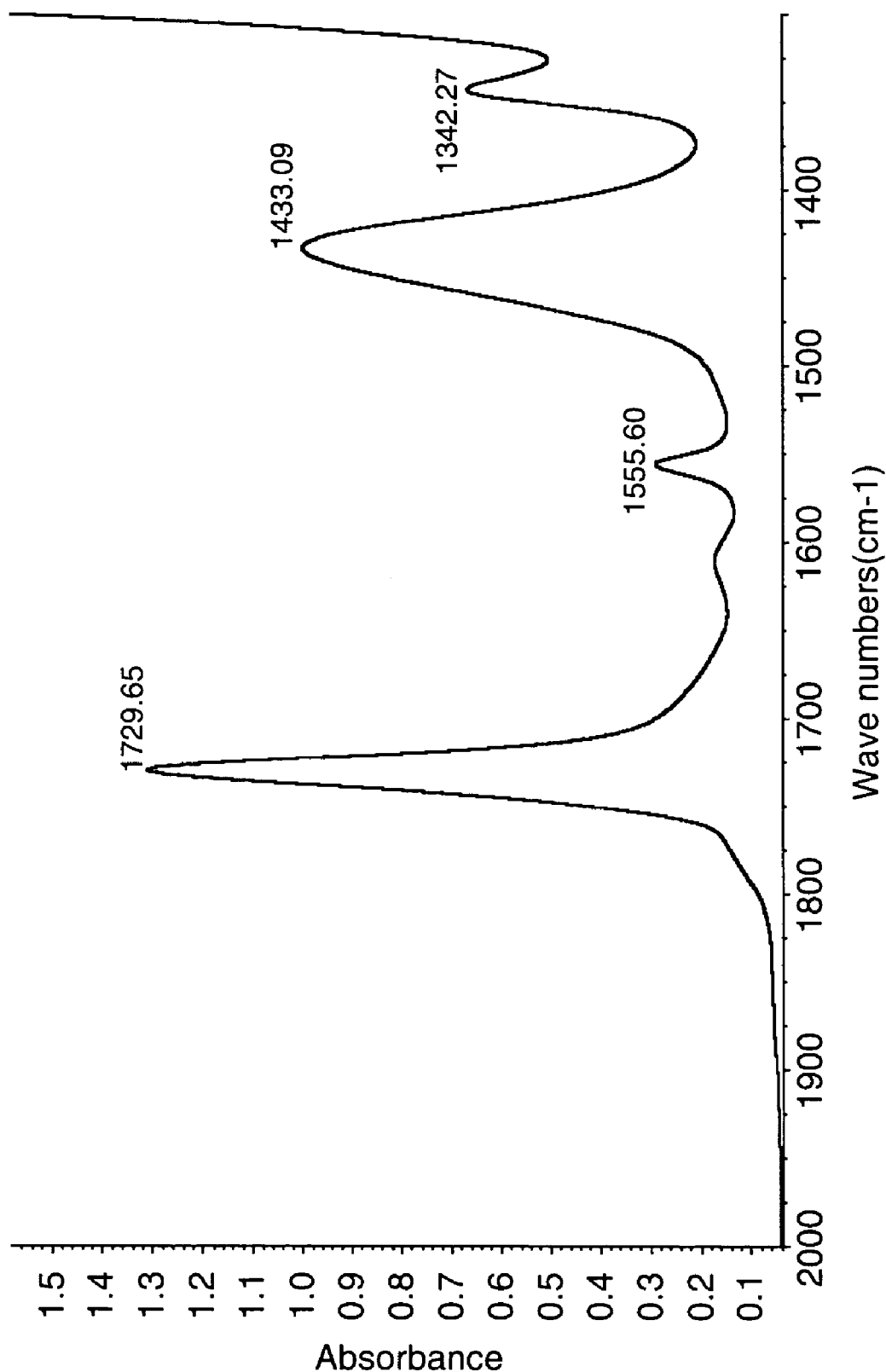
FIG. 2 is a detail of the IR spectrograph of FIG. 1 highlighting the range of 2000-1300 wavenumbers.

FIGS. 1 and 2 represent an IR spectrum taken of the material of the membrane made above. The spectra reveal a peak at 1555 cm−1 representing triazine. This demonstrates that trimerization can occur in the presence of the neutralized sulfonate functions of the polymer.

Various modifications and alterations of this invention will become apparent to those skilled in the art without departing from the scope and principles of this invention, and it should be understood that this invention is not to be unduly limited to the illustrative embodiments set forth hereinabove.

We claim:

1. A method of making a polymer electrolyte membrane comprising the steps of:
    a) providing a mixture of a polymer comprising a fluorinated backbone and first pendant groups, wherein said first pendant groups comprise groups selected from sulfonyl halide and sulfonate groups, and a bisamidine compound;

b) forming said mixture into a membrane; and c) reacting the amidine groups of said bisamidine compound to form triazine groups.

2. The method according to claim 1 additionally comprising, after step c), the step of:

d) converting said groups selected from sulfonyl halide and sulfonate groups to sulfonic acid groups.

3. The method according to claim 1 wherein said first pendant groups are according to the formula: $-R^1-SO_2X$, where X is $-O^-A^+$, where $A^+$ is an organic or inorganic cation, and where $R^1$ is a branched or unbranched perfluoroalkyl or perfluoroether group comprising 1-15 carbon atoms and 0-4 oxygen atoms.

4. The method according to claim 3 wherein $A^+$ is ammonium ion.

5. The method according to claim 1 wherein said first pendant groups are according to the formula: $-R^1-SO_2X$, where X is a halogen and where $R^1$ is a branched or unbranched perfluoroalkyl or perfluoroether group comprising 1-15 carbon atoms and 0-4 oxygen atoms.

6. The method according to claim 5 wherein X is F.

7. The method according to claim 1 wherein said first pendant groups are according to the formula: $-O-CF_2-CF_2-CF_2-CF_2-SO_2F$.

8. The method according to claim 1 wherein said first pendant groups are according to the formula: $-O-CF_2-CF(CF_3)-O-CF_2-CF_2-SO_2F$.

9. The method according to claim 1 wherein said bisamidine compounds are selected from compounds according to the formula:

$$H_2N(HN=)C-R^{11}-C(=NH)NH_2 \quad (I)$$

where $R^{11}$ is a divalent, branched or unbranched, partially or fully fluorinated, alkyl or ether group comprising 1-15 carbon atoms and 0-4 oxygen atoms.

10. The method according to claim 1 wherein said bisamidine compounds are selected from compounds according to the formula:

$$H_2N(HN=)C-R^{11}-C(=NH)NH_2 \quad (I)$$

where $R^{11}$ is a divalent, perfluorinated alkyl group comprising 2-8 carbon atoms.

11. The method according to claim 1 wherein said bisamidine compounds are according to the formula: $H_2N(HN=)C-C_4F_8-C(=NH)NH_2$.

12. The method according to claim 3 wherein said bisamidine compounds are selected from compounds according to the formula:

$$H_2N(HN=)C-R^{11}-C(=NH)NH_2 \quad (I)$$

where $R^{11}$ is a divalent, branched or unbranched, partially or fully fluorinated, alkyl or ether group comprising 1-15 carbon atoms and 0-4 oxygen atoms.

13. The method according to claim 3 wherein said bisamidine compounds are selected from compounds according to the formula:

$$H_2N(HN=)C-R^{11}-C(=NH)NH_2 \quad (I)$$

where $R^{11}$ is a divalent, perfluorinated alkyl group comprising 2-8 carbon atoms.

14. The method according to claim 3 wherein said bisamidine compounds are according to the formula: $H_2N(HN=)C-C_4F_8-C(=NH)NH_2$.

15. The method according to claim 5 wherein said bisamidine compounds are selected from compounds according to the formula:

$$H_2N(HN=)C-R^{11}-C(=NH)NH_2 \quad (I)$$

where $R^{11}$ is a divalent, branched or unbranched, partially or fully fluorinated, alkyl or ether group comprising 1-15 carbon atoms and 0-4 oxygen atoms.

16. The method according to claim 5 wherein said bisamidine compounds are selected from compounds according to the formula:

$$H_2N(HN=)C-R^{11}-C(=NH)NH_2 \quad (I)$$

where $R^{11}$ is a divalent, perfluorinated alkyl group comprising 2-8 carbon atoms.

17. The method according to claim 5 wherein said bisamidine compounds are according to the formula: $H_2N(HN=)C-C_4F_8-C(=NH)NH_2$.

18. The method according to claim 1 wherein step b) comprises imbibing said mixture into a porous supporting matrix.

19. The method according to claim 18 wherein said porous supporting matrix is a porous polytetrafluoroethylene web.

* * * * *